INVENTOR.
Theodore E. Simonton

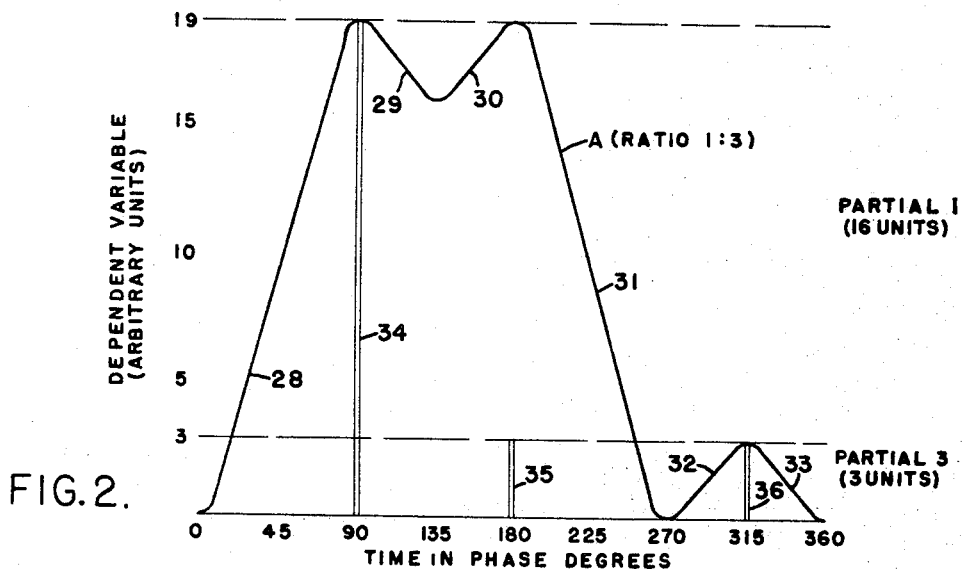
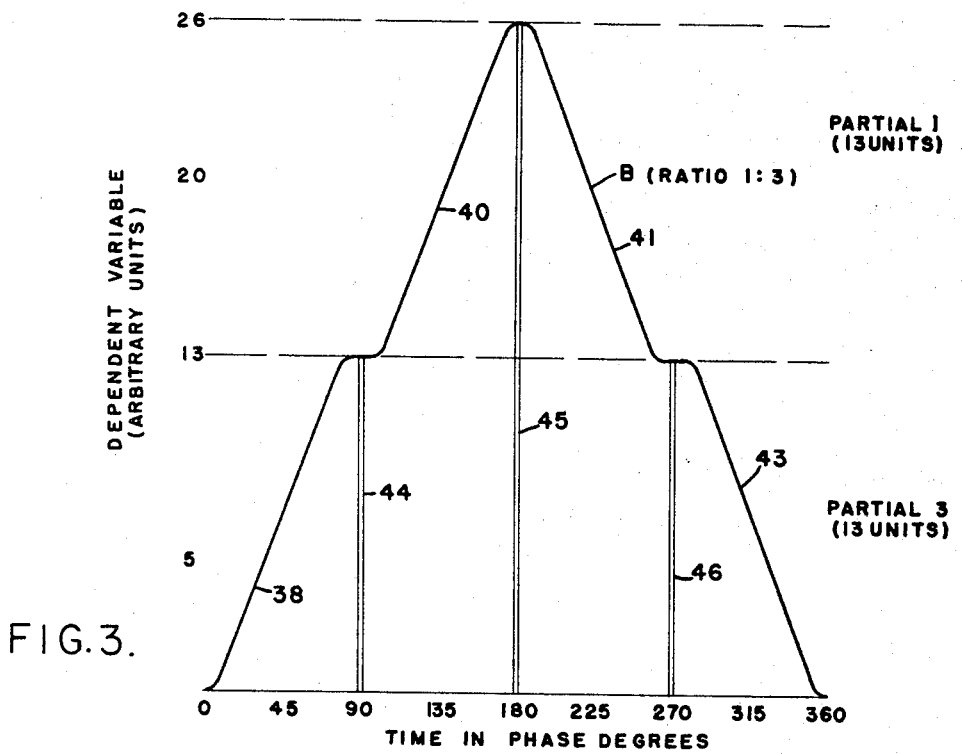

INVENTOR.
Theodore E. Simonton

INVENTOR.
Theodore E. Simonton

FIG. 7.

United States Patent Office 3,414,815
Patented Dec. 3, 1968

3,414,815
METHOD OF ANALYZING COMPLEX WAVES REPRESENTABLE BY A CONTINUOUS PLANE CURVE
Theodore E. Simonton, 11 Lincklaen St., Cazenovia, N.Y. 13035
Continuation of application Ser. No. 403,827, Oct. 14, 1964. This application Sept. 7, 1967, Ser. No. 666,217
10 Claims. (Cl. 324—77)

ABSTRACT OF THE DISCLOSURE

A continuous inventory is maintained of the curve of a complex wave, whether periodic or aperiodic, the ordinate lengths of the upswings being considered as additions to inventory and the ordinate lengths of the downswings being considered as withdrawals from inventory, subject to the proviso that the inventory can never be less than zero. Accordingly, any initial downswing of the curve is discarded, as is also any portion of a subsequent downswing in excess of that necessary to reduce the inventory to zero. The time period between one condition of zero inventory and the next is termed a "tittle." In a periodic curve, there is always an integral number of tittles, usually but not necessarily one, in each period of the curve when the period is measured from one absolute minimum to another. Either before or after the inventory determination, the upswings and downswings of the curve are converted into separate series of pulses, respectively called "in pulses" and "out pulses," each of which corresponds to a unit of ordinate length. The in and out pulses are used to determine "critical points" that are substantially the points at which the slope of the curve passes through zero. The in and out pulses are separately counted in serial order, and each out pulse is treated as canceling an in pulse having the same scalar position. All in pulses are counted, but only those out pulses are counted which correspond to downswings that are effective in reducing inventory. Sequences of the counted pulses at selected critical points fix the ordinate lengths and abscissa positions of what are called "volleys." The amplitude and temporal pattern of the volleys furnishes an analysis of the curve, including various parameters of the complex wave.

---

This application is a continuation of Ser. No. 403,827, filed Oct. 14, 1964, and now abandoned.

This invention relates to the analysis of complex waves, and relates more particularly to a method of analyzing complex waves that is capable of being carried out by machine operations and which produces numerical results suitable for use in further machine operations, such as machine recognition of an unknown complex wave.

The complex wave to be analyzed may be any wave, whether periodic or aperiodic, that can be represented by a continuous plane curve, one coordinate of which corresponds to values of an independent variable and the other to values of a dependent variable. For convenience, the independent variable will be assumed to correspond to the abscissas and the dependent variable to the ordinates of the curve. The independent variable should be directly measurable. In practice, the independent variable is usually time and, in that case, the dependent variable may be any function of time, such as amperage, liquid level, pressure, temperature, voltage, etc. The only limitation that need be imposed on the dependent variable is that it either be in a form suitable for treatment by the present invention, or be capable of being changed into a suitable form having a characteristic that varies linearly with the dependent variable. Convenient variable characteristics are voltage and amperage, into which the dependent variables with which industry and science are principally concerned, may readily be transformed by methods well known in the art.

The present invention is applicable in many fields, including, by way of example and not of limitation, the analysis of electric currents, sound waves and tidal data. Because the general problems common to all such fields are well exemplified in the machine analysis and recognition of sound waves, such waves will be used as examples in this specification. It is to be understood, however, that the same principles are applicable to any complex wave of the character described.

Among the parameters of a complex wave that may be determined by the present invention, are the respective harmonic numbers of the several partials of the complex wave and their relative magnitudes. In the case of waves of musical sounds, these partials are in agreement with those reported by the human ear. Their harmonic numbers are used in connection with the theory of music, and musicians widely applied the term "harmonics" to such partials long before the Fourier Series was discovered. The analysis of the present invention is, therefore, correctly and strictly speaking, a harmonic analysis. But mathematicians, scientists and technicians have so long and so consistently applied the name "harmonics" to the simple sine waves (hereinafter sometimes called "sine tones") that are products of the successive terms of a Fourier equation, that it would now be confusing to many people skilled in the art, to use "harmonics" in the setting of the present invention. Accordingly, the term "partials" will be used in this specification in the sense in which it has just been used, and should be understood as referring to harmonics that are not necessarily the same as Fourier sine tones derived from the same source.

Fourier analysis of complex waves is subject to the disadvantages that (1) it is often difficult and time consuming; (2) except under special circumstances, a Fourier analysis cannot be done in what is called "real time" in computer technology, that is to say, substantially simultaneously with the events to be analyzed; (3) it is, at best, an approximation when applied to aperiodic curves; (4) it frequently yields an infinite series of simple sine waves that must be chopped off at some point where they are no longer deemed to be of significant amplitude; and (5) in the case of sound waves, even those that are periodic, the sine tones resulting from Fourier analysis do not correspond to the partials that are reported by that most elegant of analyzers, the human ear, and, indeed, a highly significant partial, the fundamental, often has no counterpart in the Fourier analysis. All of these difficulties and objections are obviated by the present invention.

The analysis of the present invention produces results essentially similar to the results of the analysis performed by the human ear with, of course, certain simplifying modifications. Some parallels in this regard will be pointed out as the description proceeds. But it is immaterial whether this invention has truly copied the functions of the human ear, although it is believed to be significant to a true understanding of hearing that this invention reports partials and other parameters of a sound that are comparable to those reported under like circumstances by the ear. The presently important considerations are (1) that the parameters reported by this invention are uniquely distinctive and reproducible and (2) that if unknown sounds and known sounds are analyzed under similar conditions by the use of this invention, comparison of the resulting parameters permits identification of the unknown sounds. In effect, any detail discrepancies that may be introduced by the method of this invention simply cancel out.

For machine recognition of speech or other sounds, such as those picked up by a passive listening sonar, the parameters of an unknown sound as determined by this invention may be compared with groups of like parameters of known sounds that are stored, for instance, in the memory of a computer, thereby affording a real time determination of the input sounds. The signals resulting from such a determination may be used to operate mechanisms adapted for various purposes, such as the input of data and instructions to a computer, telephone exchange equipment for use in lieu of conventional dial switching, and automatic electric typewriters.

For any sound capable of being resolved by the cochlea of the human ear, regardless of whether the sound is periodic or aperiodic, musical or non-musical, the present invention provides a method of determining, accurately, rapidly and, if desired, as continuously as the sound itself will allow, any or all of the following parameters of the sound: (1) its effective pitch, sometimes called "periodicity pitch" (which may or may not be the same as its fundamental frequency in the accepted sense), (2) its relative overall magnitude (which magnitude is not the same as intensity as conventionally measured), (3) the harmonic numbers of its partials (which, in the general case, will not be the same as its Fourier sine tones), and (4) the relative magnitudes of the various partials. All of the foregoing parameters are expressible as a series of numbers of reasonable length.

The foregoing four parameters may not be required for the solution of a particular problem. We reach these four parameters through the medium of certain related intermediate parameters that we shall call "zero inventory" and "volleys." For many purposes, including identification of an unknown sound, these intermediate parameters will suffice. As will be shown, zero inventory corresponds to the at-rest condition of the human ear. The term "volley" is adopted because the volleys of this invention are believed to conform quite faithfully to the volleys of neural charges that are known to be transmitted to the brain by the cochlea of the human ear. Both of these terms will be more precisely defined later.

According to this invention, the zero inventory times are preferably recorded, and we shall call the interval between one zero inventory time and the next, a "tittle." A single period of a periodic wave always consists of an integral number of tittles, which number is frequently, but not always, one. The volleys invariably occur between the zero inventory times, that is to say, during a tittle, and the volley times may or may not be recorded, as may be desired.

By consideration of the variations of the volleys from tittle to tittle, we may determine any beats that would be reported by the ear and also the clarity (comparative smoothness or roughness) of the sound as the ear would, in general, report it.

The advantages and objects of this invention will appear from the foregoing and the following description, taken in conjunction with the accompanying drawings, in which:

FIGURE 2 is the curve of a particular complex way used to illustrate some of the principles of this invention;

FIGURE 3 is the curve of a complex wave having the identical components of FIGURE 2 disposed in a different phase relationship;

FIGURE 7 is a circuit diagram showing a particular form of the data compiler of either FIGURE 1 or FIGURE 5.

Figure 1:
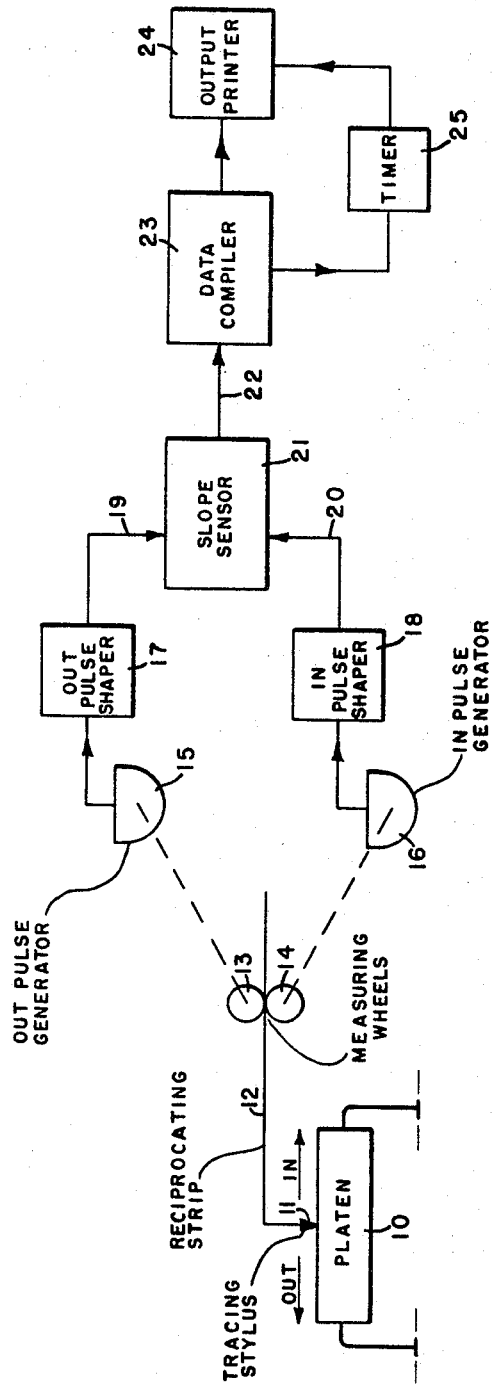
FIGURE 1 is a diagrammatic representation of a machine for analyzing a complex wave in accordance with this invention by tracing its previously prepared curve, the parts being shown in their rest positions.

It is frequently desirable to analyze a complex wave for which we already have a drawn curve, obtained, for example, from an oscilloscope. FIGURE 1 shows diagrammatically an apparatus for this purpose. After reducing or enlarging the curve, if necessary, to a convenient scale, it is mounted on the movable platen 10, which may be either a rotating cylinder or a flat bed, translatory type. An appropriate scale would be one in which the peak-to-trough amplitude of the dependent variable nearly reaches, but does not exceed, the usable width of the platen, say, five inches. The platen 10 is driven at a controlled speed by conventional mechanism, not shown. The movement of the platen in the operative direction corresponds, of course, to increasing values of the independent variable, the unit of which may be timed in suitable fractions of a second or, in the case of a periodic curve, phase degrees, and which are measured by the abscissas of the curve.

The tracing stylus 11 is caused to follow the convolutions of the curve as it passes under the tip of the stylus. This tracing operation might be done manually, but would preferably be performed by suitable automatic mechanism controlled by the curve itself, for example, optically. In FIGURE 1, the curve is assumed to be so mounted on the platen that movements of the stylus 11 to the right (the direction of the "In" arrow) correspond to increases in the value of the dependent variable, and to the left (the "Out" direction) to decreases therein. For convenience, we shall use the words "in" and "out" to refer to such increases and decreases of the dependent variable, which are measured by the ordinates of the curve.

The in and out movements of stylus 11 produce corresponding movements of reciprocating strip 12, which is directly connected to the stylus. Strip 12 passes between upper and lower measuring wheels 13 and 14, which are drivingly connected to pulse generators 15 and 16, respectively. These pulse generators are arranged to generate pulses only on rotation of their respective wheels in a given direction, say, clockwise, and to produce a separate pulse for each predetermined increment of such rotation of its associated wheel. Conveniently, each wheel and generator may be designed to produce a single pulse for each tenth of an inch of movement of strip 12 in the appropriate direction. With a five inch scale as above described, this would give a maximum of 50 pulses for a maximum change in value of the dependent variable in either direction.

It will be observed that wheel 13 turns clockwise when strip 12 moves to the left or out, corresponding to a decrease in the value of the dependent variable. The associated generator 15 is therefore called the "out pulse generator." For each downswing of the curve, out pulse generator 15 produces a series of out pulses, the number of which is directly proportional to the change in ordinate values between the beginning and end of the downswing. Similarly, in pulse generator 16 produces a series of in pulses, the number of which is directly proportional to the change in ordinate values between the beginning and end of each upswing of the curve.

As is customary, the outputs of pulse generators 15 and 16 are transmitted, respectively, to pulse shapers 17 and 18, which serve to sharpen and improve the generated pulses. In each case, a terminal portion of a swing which is less than that necessary to produce a full out or in pulse, is disregarded. We thus deal always with integral numbers in performing the operations to be described. Similarly, the active nerve ends of the human cochlea either fire or don't fire.

An in pulse constitutes an addition to inventory. An out pulse, subject to certain limitations to be described, constitutes a withdrawal from inventory. The condition of zero inventory is reached when every in pulse previously added to inventory has been canceled by an out pulse. In effect, this corresponds to the action of the stapes of the human ear. When the stapes moves inward a unit distance, it displaces a unit volume of perilymph from the vestibule and stores it in the cochlea. Conversely, when the stapes moves outward a unit distance, a unit volume of perilymph is withdrawn from the cochlea and returned to the vestibule. There is, of course, a limit to the number of units of perilymph that the cochlea can accept and store, and there is also a certain normal volume of perilymph which is contained in the cochlea when the ear is at rest during a period of complete silence. This normal volume is directly related to our zero inventory.

According to this invention, it is conclusively presumed that the inventory never drops below zero, that is to say, there can be no such thing as a negative inventory. This requires the discarding of any initial series of out pulses and also of any portion of a subsequent out pulse series beyond that sufficient to reduce the inventory to zero. One way by which this discarding may be accomplished will be described in connection with FIGURE 7.

So far as applicant is aware, none of the hitherto proposed theories of hearing allow for the partial discarding of downswings that is essential to the inventory concept of this invention, in which the inventory is always either zero or positive. Applicant is inclined to believe that the human middle ear does have structure that performs a comparable function. But whether it does or not is presently immaterial, the essential point being that such partial discarding of downswings enables this invention to provide an adequate analysis of complex waves.

The curve of a complex wave always has a plurality of maxima and minima. At a maximum, the slope change is from plus to zero to minus, which may conveniently be abbreviated as $(+)0(-)$, and at a minimum, the slope change is $(-)0(+)$. The former corresponds to a reversal of the travel of reciprocating strip 12 from in to out, and the latter, to a reversal from out to in. The $(+)0(-)$ change is, therefore, indicated by the cessation of a series of in pulses in the output of shaper 18 followed by the commencement of a series of out pulses in the output of shaper 17, and vice versa for change $(-)0(+)$. A complex wave may also have two other types of slope change at which the slope passes through zero, namely, $(+)0(+)$ and $(-)0(-)$. The former corresponds to a momentary interruption of the in travel of strip 12, and the latter to a momentary interruption of its out travel.

The outputs of pulse shapers 17 and 18 are fed through circuits 19 and 20, respectively, to slope sensor 21, which detects each of the four types of slope changes. Sensor 21 transmits a single control pulse through circuit 22 to data compiler 23 at substantially the instant when the slope of the curve under examination departs from zero during the course of each such slope change. We shall call these points where the slope of the curve passes through zero, "critical points." The control pulses corresponding to slope changes of $(+)0(+)$, $(+)0(-)$ and $(-)0(-)$ will be called "firing pulses," because they initiate the firing of a volley. The control pulses corresponding to slope changes of $(-)0(+)$ will be called "zeroing pulses," because they serve to test whether a condition of zero inventory exists. Sensor 21 also somewhat modifies the out pulses in line 19 and the in pulses in line 20 before passing them on to the data compiler. The manner in which these functions are accomplished will be described later in connection with FIGURE 6.

Although a plurality of lines are required to conduct these various pulses to data compiler 23, they are conventionally indicated by the single circuit 22 in FIGURE 1.

The primary purposes of data compiler 23 are to determine when a condition of zero inventory is reached and the length of each volley. The specific functions of compiler 23 will be pointed out in connection with FIGURE 7. For the moment, it suffices to say that data compiler 23 performs certain computations based upon the pulsed information it receives, and transmits the results to output printer 24. A timer 25 also receives instructions from compiler 23 and feeds into printer 24. Timer 25 is calibrated in terms of the same unit as the independent variable of the curve being traced, and is driven in unison with platen 10 by conventional means, not shown, so that the timer indicates the value of the independent variable at the instant when tracing stylus 11 is over a particular point on the curve. When instructed by compiler 23 to do so, timer 25 transmits the then time to output printer 24 for printing in association with other data being recorded at that instant.

FIGURE 2 shows a curve A that represents one period of a periodic compound tone having two components with a frequency ratio of 1:3. The components of the compound tone are two sine tones having the same intensity as conventionally measured. This relationship requires that the higher sine tone have one-third the peak amplitude of the lower one. The phase relationship of the two sine tones is so chosen that the question of the compound tone is:

$$p = 3a \sin \theta + a \sin 3\theta$$

where $p$ is the sound pressure. In this specification, the term "sound pressure" always means the instantaneous sound pressure, because that is what the ear deals with.

The single period illustrated is deliberately chosen to commence with an absolute minimum of the curve, so that no upswing or downswing of the dependent variable is interrupted save at a critical point. For curve A, these critical points are seven in number, at 0°, 90°, 135°, 180°, 270°, 315° and 360°. With respect to the dependent variable, sound pressure, we need be concerned only with changes in its ordinate values between these critical points. These values are given on the scale at the left of FIGURE 2 and the scale unit may be quite arbitrary. This is usually necessary because the extent of amplification of a sound wave is rarely determined with any considerable degree of precision, and, for most purposes, need not be. Where desired, however, the scale unit could be calibrated in terms of a conventional unit of the dependent variable, such as the microbar for sound pressure.

It will be observed that curve A has absolute minima at 0°, 270° and 360°. These absolute minima correspond to the condition that we have called "zero inventory," and which, when reported by output printer 24, may conveniently be indicated by the letter Z.

We shall assume that one ordinate unit of FIGURE 2 corresponds to one pulse in analyzing curve A by the apparatus of FIGURE 1. Consistent with the pulsing scheme described in connection with FIGURE 1, the ordinate values should always be read from the curve as being integral.

From 0° to 90°, curve A displays upswing 28 having an ordinate length of 19 units. On the foregoing assumption, upswing 28 corresponds to a series of 19 in pulses produced by pulse generator 16. From 90° to 135°, we have downswing 29 of 3 units, corresponding to a series of 3 out pulses produced by generator 15, and leaving a remainder of 16 in pulses in the inventory. From 135° to 180°, we have upswing 30 of 3 units, increasing the inventory to 19. This is immediately followed by downswing 31 of 19 units terminating at 270°, yielding zero inventory. From 270° to 315°, we have upswing 32 of 3 units, followed by downswing 33 of 3 units extending from 315° to 360°, again producing zero inventory. Since curve A is periodic, a continuation of it would simply constitute a repetition of the foregoing.

Regarding curve A as extending both before and after the single period illustrated in FIGURE 2, it will be observed that curve A presents only two types of slope changes. These are $(-)0(+)$ at 0°, 135°, 270° and 360°, corresponding to minima of curve A, and $(+)0(-)$ at 90°, 180° and 315°, corresponding to maxima of curve A. Accordingly, curve A produces three volleys, indicated by the vertical double lines 34, 35 and 36 appearing at 90°, 180° and 315°, respectively, in FIGURE 2, each of which coincides timewise with a $(+)0(-)$ slope change. As reported by output printer 24, each volley may conveniently be indicated by the letter V followed by an integral number corresponding to its length. Thus, for curve A, the volleys would be reported as: V19, V3, V3.

In the special case of the relatively uncomplicated curve A, the lengths of the respective volleys, as indicated by the double lines 34, 35 and 36, are precisely equal to the ordinate lengths of the imemdiately preceding upswings of curve A. As we shall see later, this simple situation is not generally the case, and the volley lengths are quite apt to differ from their preceding upswings.

The result of the operation of the apparatus of FIGURE 1 on curve A is that output printer 24 will report, if T be used as an abberviation for time: T0, Z; T90, V19; T180, V3; T270, Z; T315, V3; and T360, Z. This is the only information that needs to be recorded, and constitutes an adequate analysis of curve A. Indeed, for many purposes, this report could be simplified by omitting either the Z times or the V times, although one or the other will usually be necessary.

It is sometimes desirable to carry the foregoing data presentation somewhat further. As indicated at the right of FIGURE 2, such a further computation results in showing a "partial 1" of 16 units and a "partial 3" of 3 units, for an overall magnitude of 19 units. This information may be abbreviated as: 1P16, 3P3, M19. The overall magnitude M is equal to the value of the longest volley. The harmonic numbers of the partials are obtained by dividing the volleys into zones according to their lengths, and counting the volleys in each zone. The harmonic number of the highest partial is equal to the total number of volleys in the period. The partial lengths correspond directly to the height of each zone, and their sum is equal to M.

FIGURE 3 illustrates a complex curve B which is identical to curve A except that a different phase relationship of the two sine tones is chosen. This phase relationship is such that the equation of the compound tone of curve B is:

$$p = 3a \sin \theta + a \sin (3\theta + 180)$$

From 0° to just short of 90°, curve B has upswing 38 of 13 units, and from just above 90° to 180°, upswing 40 also of 13 units. In the neighborhood of 90°, these two upswings are separated by an appreciable time length of the curve during which the slope is zero, corresponding to the shoulder of the curve. From 180° to nearly 270°, there is downswing 41 of 13 units, followed by an appreciable period of zero slope represented by the shoulder of the curve at 270°, and from just above 270° to 360°, there is downswing 43 of 13 units.

It will be observed that curve B has only one maximum at 180° and two absolute minima at 0° and 360°. Between these three critical points, curve B has critical points at 90° and 270°, corresponding to slope changes of $(+)0(+)$ and $(-)0(-)$, respectively. Slope sensor 21 transmits a firing pulse through circuit 22 to data compiler 23 substantially at the three critical points of 90°, 180° and 270°.

Curve B is resolved by data compiler 23 into the three volleys indicated by the vertical double lines 44, 45 and 46 at 90°, 180° and 270°, respectively. Volley 44 has a value of 13 units, exactly equal to the ordinate length of upswing 38. Upswing 40 will generate 13 in pulses in circuit 22, but these will be added to the in pulses of upswing 38 to produce volley 45 having a value of 26 units rather than the 13 units which might be the naive expectation. The 13 unit value of volley 46 is equal to the number of out pulses generated by preceding downswing 41. It is merely a fortuitous circumstance that volley 46 is also equal to downswing 43.

The report of output printer 24 for curve B will be as follows: T0, Z; T90, V13; T180, V26; T270, V13; and T360, Z. A further computation similar to that performed for FIGURE 2 would be reported for curve B as: 1P13, 3P13, M26.

It will be observed that curve B, like curve A, produces three volleys. The three volleys of the two curves differ in their values, but two of them in each case have identical time positions, and the three volleys represent the same two partials. The similarities between the three volleys in each case reflect the fact that a musical ear will report the sound corresponding to each of these two very different appearing curves as being a diad having the musical interval of a Twelfth (ratio 1:3). Despite this fact, and notwithstanding the numerous loose statements by acousticians that the human ear is insensitive to phase displacements, the ear will not perceive the two sounds identically. Instead, the compound tone of curve B will be reported as being louder than that of curve A, corresponding to their overall magnitudes of M26 and M19, respectively. These overall magnitudes are in at least rough agreement with overall loudness as reported by the human ear. Furthermore, partial 1 of curve A will be heard as being considerably louder than its partial 3, whereas partials 1 and 3 of curve B will be heard as having the same loudness.

Instead of the exact frequency ratio 1:3 of FIGURES 2 and 3, let us suppose that the higher sine tone is mistuned by a small amount, say two cycles per second. Then, if the lower tone were 200 c.p.s. and the upper tone 602 c.p.s., we would have, for the supposed curve 200:(602−2)=1:3. The compound tone would be heard by a normal ear to beat at the rate of two beats per second. This invention will report exactly the same beating phenomenon.

The curve of the beating compound tone is not periodic, but instead will very closely resemble a continuous change in shape from curve A to curve B and back to curve A, etc. If the curve A shape exists at a given instant, that of curve B will exist one-quarter second later and that of curve A again yet another one-quarter second later. In between, there will be a continuous gradation of the compound curve from one shape to the other. Beats are usually counted at each peak of overall loudness, so that the first beat would be counted at the first appearance of curve B, the second beat at its second appearance, etc.

If a considerable curve length of this beating compound tone were analyzed by the apparatus of FIGURE 1, the only period of exact repetition would be the beat period, namely, one-half second. Nevertheless, we would still have a series of tittles separated by zero inventory, with each tittle usually containing three volleys but sometimes with successive tittles containing two volleys and one volley, as is the case with curve A. The duration of the one or two tittles presenting such a group of three volleys, is a measure of the effective pitch of the beating tone at any instant. In this situation, an inspection of the output of printer 24 would readily reveal both the beat period and the characteristic division of the volleys into groups of three. Similarly, a computer, in the memory of which had been stored a number of compound tones of the general nature in question, would be able to identify speedily the assumed beating compound tone.

Figure 4:
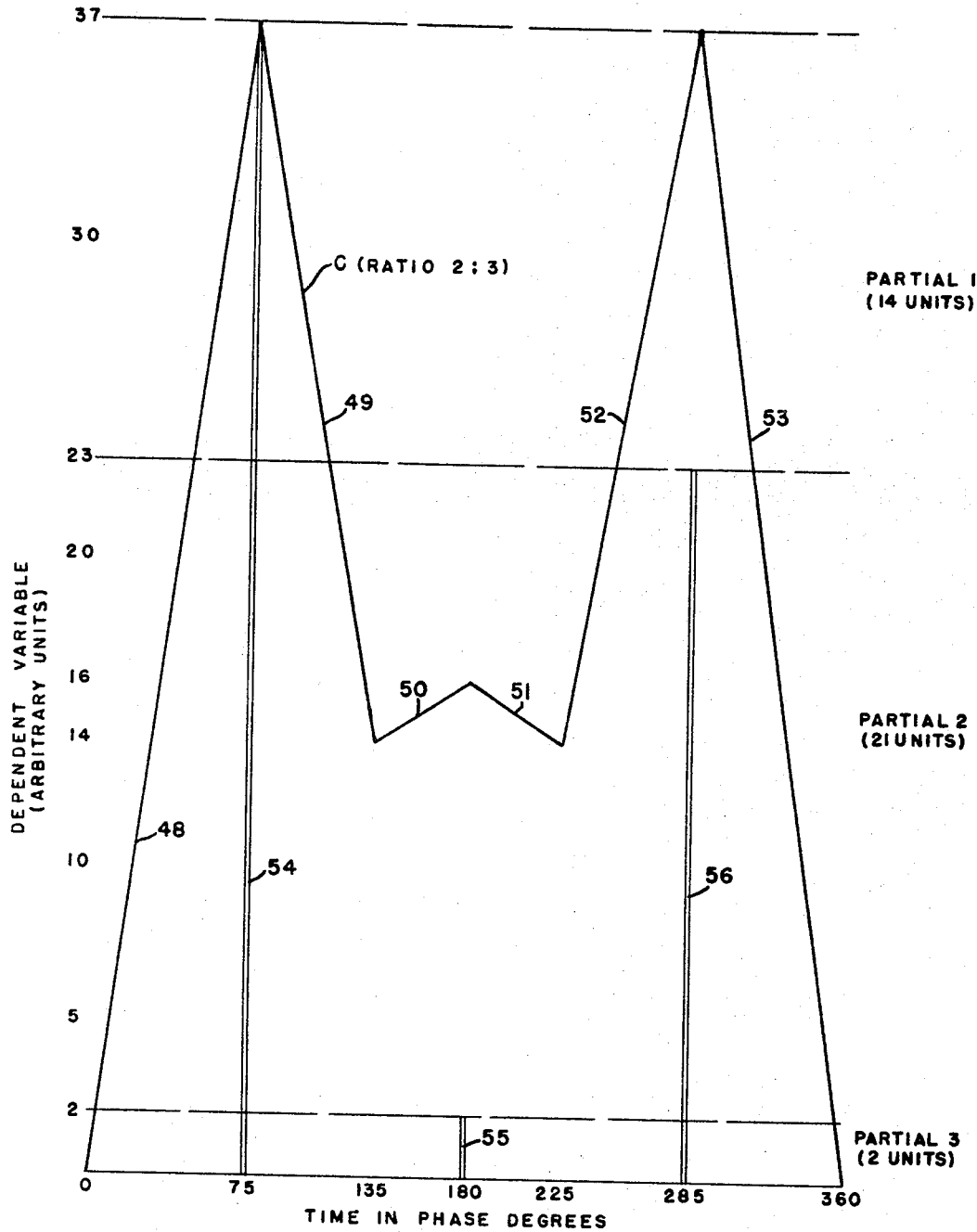
FIGURE 4 is the curve of a different complex wave also used to illustrate the principles of this invention.

Curve C of FIGURE 4 is a stylized and highly approximate representation of a single period of a compound tone composed of two sine tones of equal intensity having the 2:3 frequency ratio of a musical Fifth. The equation of the diad is:

$$p = 3a \sin(2\theta - 90) + 2a \sin(3\theta - 90)$$

Curve C starts at 0° with upswing 48 of 37 units ending at 75°. Downswing 49 of 23 units extends from 75° to 135°, and is followed by upswing 50 of 2 units ending at 180°. Downswing 51 of 2 units extends from 180° to 225°, and is followed by upswing 52 of 23 units ending at 285°. Downswing 53 of 37 units extends from 285° to the end of the period at 360°.

Data compiler 23 resolves curve C into the three volleys indicated by the vertical double lines 54, 55 and 56 at 75°, 180° and 285°, respectively. Each of these volleys is equal to the ordinate length of its immediately preceding upswing. The report of output printer 24 for curve C will be: T0, Z; T75, V37; T180, V2; T285, V23; and T360, Z. Further data for curve C is: 1P14, 2P21, 3P2, M37.

Fourier analysis of this compound tone would yield only the two sine tones indicated by its equation. Nonetheless, the ear will report the so-called "absent fundamental." It will be observed that this invention follows the ear in reporting a relatively strong partial 1. Partial 3, on the other hand, is relatively weak, despite the fact that the two sine tones making up the compound are of the same intensity. FIGURE 4 thus illustrates the well known phenomenon of absorption of a higher tone by a lower tone, usually called "masking," as does also FIGURE 2. Both as regards the presence of the fundamental and masking, the report of this invention faithfully follows the report of a good musical ear.

Figure 5:
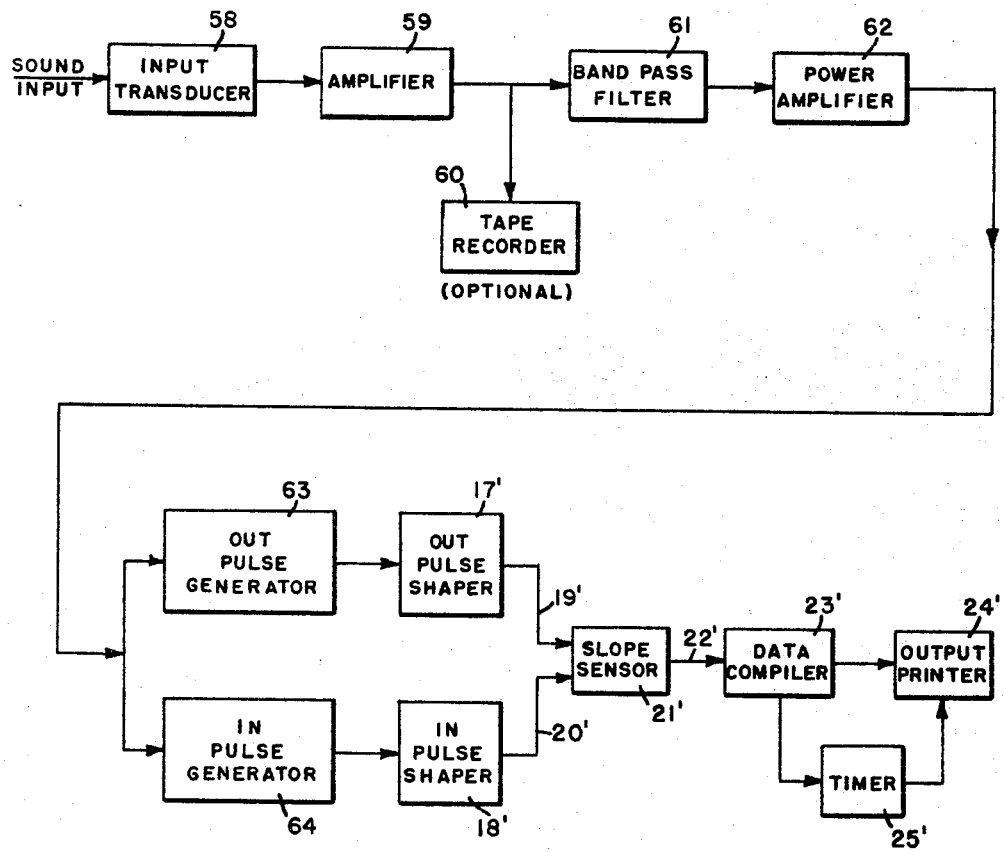
FIGURE 5 is a block diagram of an electrical apparatus for analyzing sound in accordance with this invention.

Turning now to the block diagram of FIGURE 5, the sound to be analyzed is picked up by input transducer 58, which may be a high fidelity condenser microphone provided with the customary preamplifier. The resulting signal is amplified in amplifier 59 and may then, if desired, be recorded by optional tape recorder 60. In any event, the amplified signal goes to band pass filter 61, the purpose of which is to restrict the frequencies that are to be analyzed by those that are needed in the particular case. For speech work, the pass band of the filter may be the six octave range from 75 c.p.s. to 4800 c.p.s., because the essential information of speech is contained between these frequencies. The filtered signal is then further amplified in power amplifier 62. The signal output of amplifier 62 is in the form of an electric current the amperage of which is modulated in accordance with the variations of sound pressure of the sound input.

The output of amplifier 62 goes to both out pulse generator 63 and in pulse generator 64. These two generators perform the same functions as the elements 12–16 of FIGURE 1 but, of course, do so wholly electronically rather than partly mechanically. Generator 63 is constructed to produce a single out pulse for each small decrease in signal amperage of a predetermined extent, and generator 64 is constructed to produce a single in pulse for each small increase in signal amperage of the identical extent.

Beyond these two generators, the elements of FIGURE 5 may be identical to the corresponding elements of FIGURE 1. They are, therefore, indicated by the same reference numerals but the primes added. However, timer 25' differs from timer 25 in that the former is driven by a clock-type device so as to measure the independent variable in actual time units, for example, milliseconds.

Figure 6:
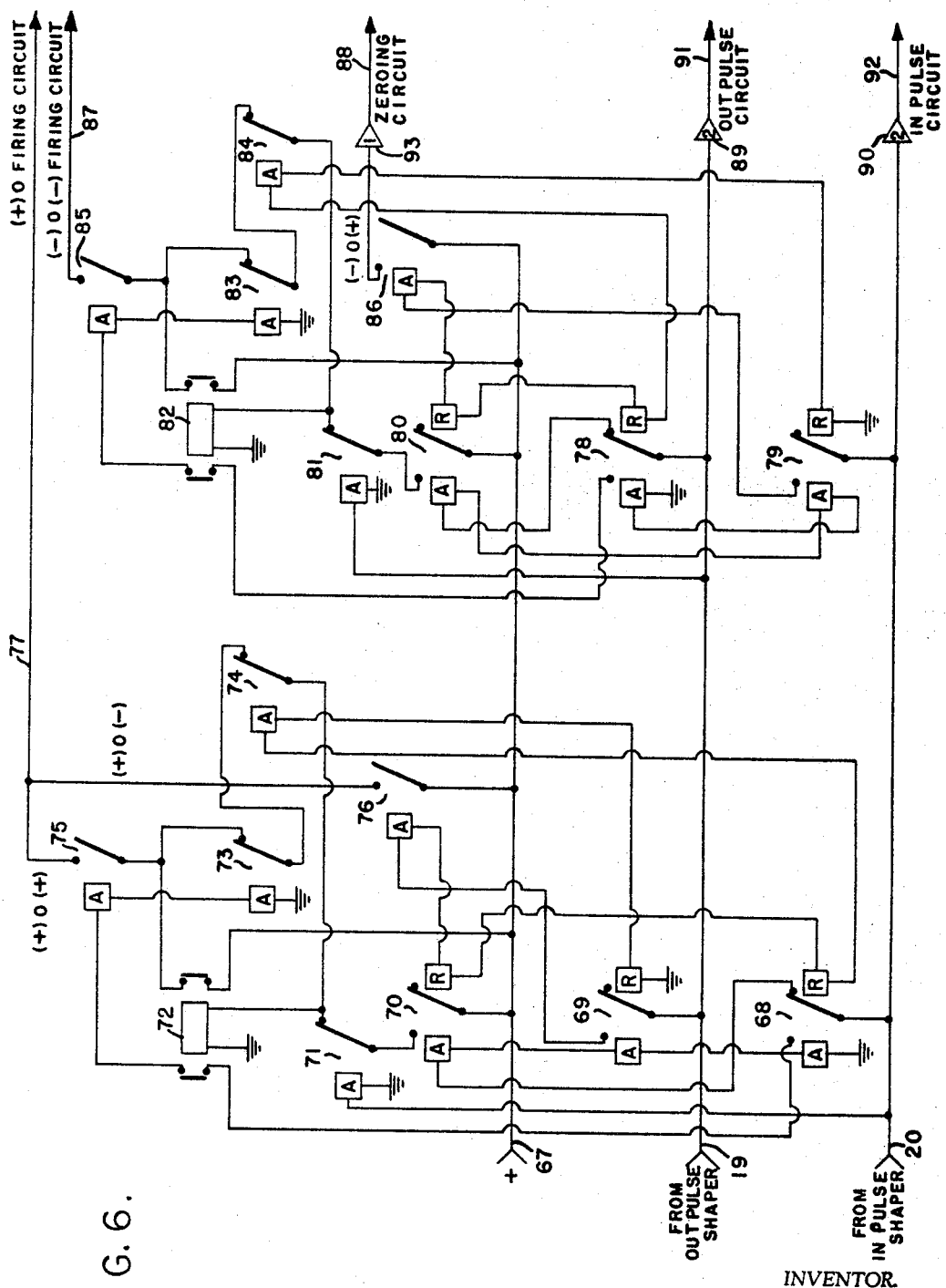
FIGURE 6 is a circuit diagram showing a particular form of the slope sensor of either FIGURE 1 or FIGURE 5.

Illustrative circuitry for pulse sensor 21 or 21' is shown in FIGURE 6. The word "illustrative" is used because FIGURE 6, for convenience of description, shows switching devices of conventional construction. In practice, in order to achieve a satisfactory speed of operation, these devices should be high speed switching elements, such as the solid state devices that are customarily employed in electronic computers and which are capable of performing the specified switching functions. The same comment applies equally to the switching devices of FIGURE 7.

At the left of FIGURE 6, line 67 proceeds from the positive side of a suitable direct current power supply, line 19 from out pulse shaper 17 or 17' and line 20 from in pulse shaper 18 or 18'. The rest of the diagram consists principally of two vertically divided halves, each of which is quite independent of the other and which are essentially similar in construction.

The left-hand half includes three two-position relays 68, 69 and 70, a timing switch 71, a self-holding relay 72, two normally closed switches 73 and 74 in the holding circuit of relay 72, and two pulsers 75 and 76. All of these switching devices are shown in their rest positions.

The relays 68, 69 and 70 must be actuated to move them from one position to the other, remaining in their last position until again actuated. The A coil of each relay, when energized, moves the relay to its active position, and the R coil, when energized, returns the relay to its rest position. The actuating coil A of timing switch 71 is directly connected to line 20, and this normally closed switch is timed to remain in its actuated or open position for a brief period after receipt of an energizing in pulse, this period being at least as long as, but not substantially greater than, the time interval between successive in pulses of a series. Consequently, switch 71 remains open during the entire time that a series of in pulses is present in line 20, and closes shortly after the cessation of the series.

Self-holding relay 72 controls two circuits which are illustrated, for convenience, at opposite ends of the relay, and both of which are normally open. Switches 73 and 74 are opened momentarily when energized, and immediately thereafter return to their rest, normally closed positions. Pulsers 75 and 76 close momentarily when energized, and return to their rest, open positions immediately after transmitting a firing pulse of predetermined length to firing circuit 77.

Starting from rest position, an out pulse in line 19 will have no effect on the foregoing switching devices, the circuit being broken at relay 69. Upon the appearance of an in pulse in line 20, the A coils of relays 70, 69, 68 are energized, thereby moving these relays to their active positions. These three relays remain in their active positions throughout a series of in pulses and also throughout any immediately succeeding dwell period corresponding to a condition of zero slope, such as shown at 90° in FIGURE 3. During any such dwell period, timing switch 71 returns to its rest, closed position, thereby completing a circuit from power line 67 to the coil of relay 72. The result of the combined action of relay 70 and timing switch 71 is that the circuit from power line 67 to the coil of self-holding relay 72 is completely closed only during a period of zero slope that is preceded by an in pulse.

When relay 72 is energized, it closes its self-holding circuit from power line 67 through the spaced contacts at the right of the relay and through the then closed switches 73 and 74. Energization of relay 72 also closes a circuit through the spaced contacts at the left of the relay from line 20 through relay 68, then in its active position, to the A coils of pulser 75 and switch 73. Upon the subsequent appearance of an in pulse in line 20, that in pulse will open timing switch 71 and will also energize pulser 75 and switch 73. The former will send a pulse into firing circuit 77 and the latter will momentarily open the holding circuit of relay 72, causing the relay to drop out, since switch 71 is then open. The relays 68, 69 and 70 will, however, remain in their active positions, whereby another dwell period followed by another in pulse will again cause pulser 75 to send a firing pulse into circuit 77.

In this active position of relays 68, 69, 70, upon the appearance of an out pulse in line 19, that pulse will pass from relay 69 through the A coil of pulser 76, the R coils of relays 70, 68, the A coil of switch 74 and the R coil of relay 69. Pusher 76 will thereupon transmit a firing pulse to circuit 77, both the main power supply circuit and the holding circuit of relay 72 will be opened, causing that relay to drop out if it is then closed, and relays 68, 69, 70 will be actuated to their rest positions. Immediately after the termination of this out pulse, therefore, all of the parts will again be in their rest positions.

The overall results of these switching operations are that a firing pulse is transmitted to circuit 77 upon the occurrence of the in pulse that completes a (+)0(+) slope change, and that a firing pulse is transmitted to circuit 77 upon the occurrence of the out pulse that completes a (+)0(−) change. It will be observed that it is immaterial to the latter operation whether the activating out pulse immediately follows a series of in pulses or is preceded by an intervening period of zero slope sufficiently prolonged to energize self-holding relay 72. In other words, pulser 76 responds either to a substantially instantaneous change from plus slope to minus slope or to a change from plus slope through a prolonged zero slope to minus slope.

Turning now to right-hand half of FIGURE 6, the elements 78–86, inclusive, are identical to the above described elements 68–76, respectively, and so are their general functions. The wiring is also the same except that the connections to lines 19 and 20 are reversed, and that the outputs of pulsers 85 and 86 are independent of one another. Upon the occurrence of the out pulse that completes a (−)0(−) slope change, pulser 85 transmits a firing pulse to firing circuit 87. Upon the occurrence of the in pulse that completes a (−)0(+) slope change, whether the passage through zero slope be short or long, pulser 86 transmits a zeroing pulse to zeroing circuit 88.

With suitably rapid switching devices, the firing pulses produced by pulsers 75, 76 and 85 and the zeroing pulses produced by pulser 86 will lag only very slightly behind the respective in and out pulses that initiate these control pulses. In practice, each control pulse may conveniently be generated substantially during the interval between its initiating pulse and the succeeding pulse, and this will be assumed to be the case. But the curve condition reflected by a control pulse corresponds timewise not to the initiating pulse, but to the immediately preceding pulse. For example, a (+)0(−) firing pulse is initiated by the out pulse following a series of in pulses, but it reflects the zero slope condition existing at the end of the preceding in pulse.

Figure 7:
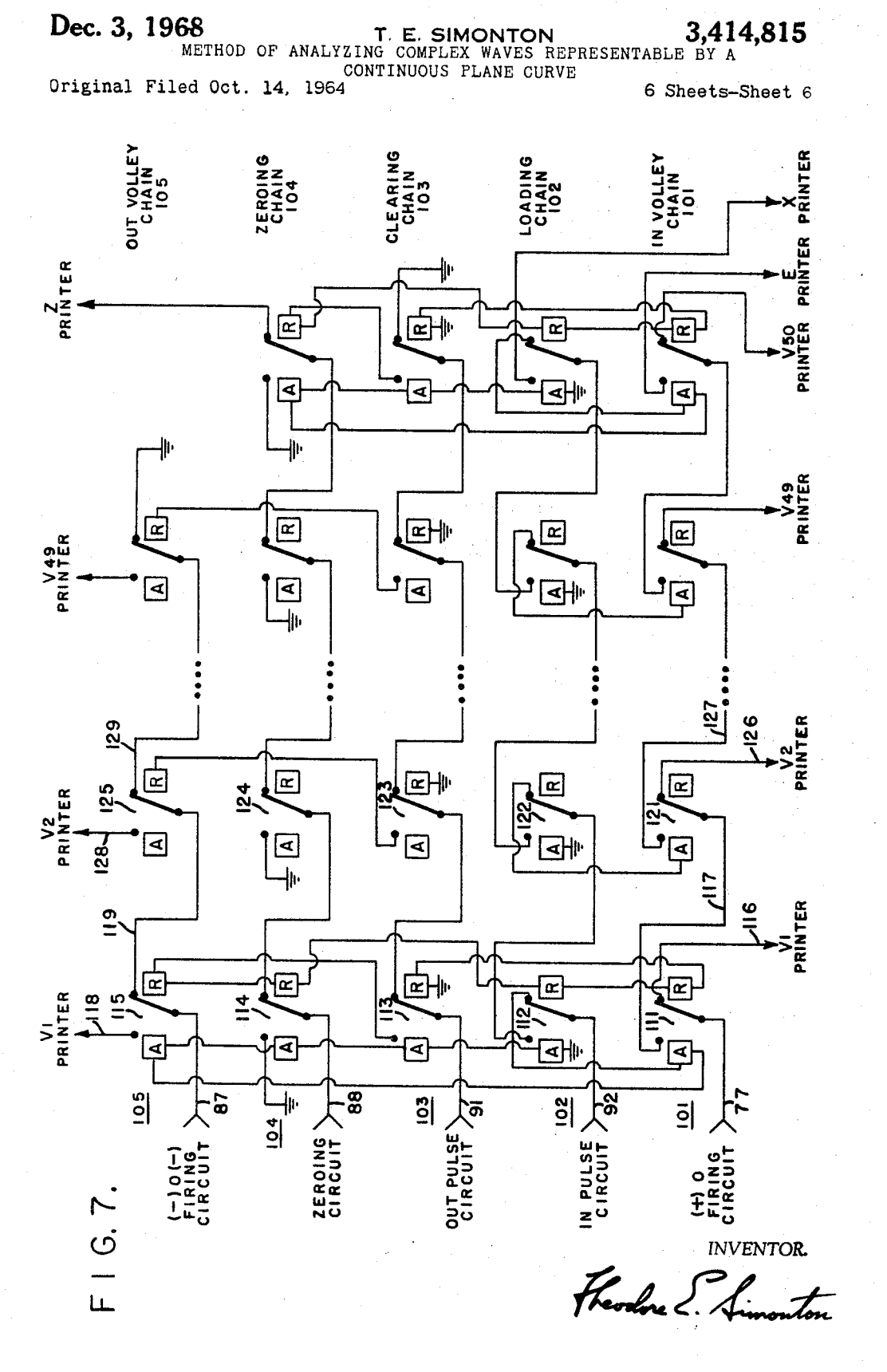

For reasons that will appear in connection with FIGURE 7, it is convenient to have each firing pulse perform its data compiling functions just before the in or out pulse that creates the curve condition which the firing pulse reflects, arrives at the data compiler and performs its functions. Preferably, therefore, each firing pulse should arrive at the data compiler during the interval immediately before the arrival of the in or out pulse preceding its initiating pulse. In order to accomplish this, at the right of FIGURE 6, time delay units 89 and 90 are inserted in circuits 19 and 20. The outputs of time delay units 89 and 90 are delivered to out pulse circuit 91 and in pulse circuit 92, respectively. These conventionally indicated time delay units may be of any suitable construction such as is customarily employed in the computer art, and serve to delay the out and in pulses by an amount sufficient to accomplish the foregoing result. A delay of two pulse periods suffices for this purpose.

On the other hand, a zeroing pulse should arrive at the data compiler of FIGURE 7 just before the in pulse that initiated it. It therefore requires only a one pulse period delay. To adjust to this situation, the one period delay unit 93 is inserted in zeroing circuit 88.

As shown in FIGURE 7, the five slope sensor output circuits constitute the input to the data compiler 23 or 23' of that figure. Each of these five circuits feeds into a horizontal chain of two-position relays of the same general type as the two-position relays of FIGURE 6. Reading FIGURE 7 from the bottom up, firing circuit 77 feeds into horizontal chain 101 which we shall call the "In Volley Chain"; in pulse circuit 92 feeds into "Loading Chain" 102; out pulse circuit 91 feeds into "Clearing Chain" 103; zeroing circuit 88 feeds into "Zeroing Chain" 104; and firing circuit 87 feeds into "Out Valley Chain" 105. All of the relays of FIGURE 7 are shown in the rest positions that they occupy at zero inventory.

The relays of these horizontal chains are arranged, for convenience, so as to form vertical cross chains. The first relay of each horizontal chain is indicated as 111, 112, 113, 114 and 115, respectively, and these five relays constitute the first cross chain. The number of these cross chains is equal to the number of in pulses of the longest series of such pulses that it is desired to be able to handle. In the specific example of FIGURE 1, with its five-inch maximum swing and one-tenth inch pulsing, fifty such cross chains would be required, and this is the number indicated in FIGURE 7.

Each cross chain, when properly set and energized by a firing pulse, serves to actuate output printer 24 or 24' to print a volley symbol corresponding to the position of the cross chain in the series, and, if desired, also to print a time symbol corresponding to the time as then registered by timer 25 or 25'. Accordingly, the output lines at the top and bottom of the first cross chain are indicated as leading to the "V1 Printer," the second cross chain to "V2 Printer," etc. With the exception of the last two cross chains, V49 and V50, all of these cross chains are wired exactly alike. For simplicity, therefore, the detail wiring is shown only for the V1 and V50 chains, and the chains intervening between V2 and V49 are indicated merely by rows of dots.

Upon the arrival of the first in pulse from circuit 92, it will be directed by relay 112 through the A coils of relays 111, 115, 114 and 113, and thence through the A coil of relay 112 to ground. The five relays of chain V1 are thus actuated to their A positions progressively and practically simultaneously by this first in pulse. With relay 112 now in its A position, a second in pulse will proceed along loading chain 102 to relay 122, whereupon it will actuate the relays 121, 125, 124, 123 and 122 of chain V2 to their A positions in the same manner as described for chain V1. Additional in pulses from circuit 92 will proceed along loading chain 102 actuating successive cross chains to their active positions in the same manner.

Upon the arrival of the first out pulse from circuit 91, it will be directed by relay 113, which is then in its A position, through the R coils of relays 115, 114, 112 and 111, and thence through the R coil of relay 113 to ground. The five relays of chain V1 are thus actuated to their R positions progressively and substantially simultaneously by this first out pulse. With relay 113 now in its R position, a second out pulse will proceed along clearing chain 103 to relay 123, whereupon it will actuate relays 125, 124, 122, 121 and 123 of chain V2 to their R positions in the same manner as described for chain V1. Additional out pulses from circuit 91 will proceed along clearing chain 103 actuating successive cross chains to their rest positions in the same manner.

It will be observed that, upon actuation of the relays of chain V1 to their A positions, relay 111 disconnects the V1 printing line 116 at the bottom of the cross chain from firing circuit 77, and connects that circuit to relay 121 through line 117. Firing circuit 77 is then connected through relay 121 to line 126 leading to the V2 printer, which makes this line 126 the only one of the printing lines of in volley chain 101 that is then in condition to print a volley. Also, upon actuation of the relays of chain V1 to their A positions, relay 115 connects firing circuit 87 to the V1 printer line 118 and disconnects that circuit from line 119 leading to relay 125. Accordingly, the V1 printer is then the only one connected to out volley chain 105 in such manner as to be in condition to print a volley. Additional in pulses and out pulses carry these processes along as above described, leaving, in each case, only a single printer associated with in volley chain 101 and a single printer associated with out volley chain 105 in condition to print.

With the foregoing circuitry, the inventory at any instant will be measured by the number of cross chains that then have their relays at their A positions. In effect, in pulses are successively stored in inventory by loading chain 102, and are removed from inventory by out pulses received by clearing chain 103. For firing circuit 77, the cross chain set to print is the lowest numbered one with its relays at R, and for firing circuit 87, it is the lowest numbered one with its relays at A. In either case, the higher numbered cross chains have no effect upon volley printing. As we shall see, this is necessary in order to take care of "remainders."

If an in pulse should arrive in circuit 92 when all of the relays of loading chain 102 are in their A positions, this would indicate that stylus 11 of FIGURE 1 had swung too far in the in direction or that power amplifier 62 of FIGURE 5 had amplified the signal beyond the ability of data compiler 23' to handle it. In each of these situations, therefore, the last relay of loading chain 102 diverts the excess in pulse or pulses to cause the output printer to print X, indicating that an extreme condition exists which should be corrected. A somewhat comparable situation arises when too loud a sound impinges on the human ear. Assuming that the sound is not so loud as to damage the ear, the excess perilymph forced into the cochlea by an extreme inward movement of the stapes, escapes from the vestibule gallery to the drum gallery of the cochlea by way of the helicotrema, a small hole at the apical end of the cochlea that connects these two gallaries. Such excess perilymph is accommodated in the drum gallery by outward movement of the round window, and is, in effect, "washed out" through the helicotrema so far as producing any neutral activity of the hair cells is concerned. The ear's report of the sound to the brain is correspondingly distorted.

With all relays in their rest positions as shown in FIGURE 7, the first pulse arriving at the data compiler will normally be either an out pulse or a zeroing pulse. If it is an out pulse, it will be passed along clearing chain 103 form relay to relay until it reaches the last cross chain, where it will be discharged to ground without accomplishing anything. In this manner, any initial series of out pulses is discarded. Similarly, if a series of out pulses is long enough to restore all cross chains to their R positions, thereby canceling all in pulses previously stored in loading chain 102, any succeeding out pulses of that series will be discharged to ground at the end of clearing chain 103 without accomplishing anything. Any out pulses beyond those necessary to create zero inventory are thus discarded. In effect, any negative value of the inventory is disregarded and treated as being the same as zero inventory.

If the first pulse is a zeroing pulse, it will have been initiated by an in pulse that succeeded an out pulse, but the zeroing pulse will arrive at the data compiler ahead of its initiating pulse, by reason of the functioning of time delay units 89, 90, 93 of FIGURE 6. Such a first zeroing pulse will be passed along zeroing chain 104 from relay to relay until it reaches the last cross chain, where it will be directed to the output line marked "Z Printer." This pulse will cause output printer 24 or 24' to print the letter Z indicating zero inventory and, if desired, will also cause it to print the time as then registered by timer 25 or 25'. On the other hand, if a zeroing pulse arrives when any cross chain is at its A position, the zeroing pulse will be directed to ground at the first such chain it encounters. Consequently, a zeroing pulse corresponding to a minimum of the curve lying above a previously reached minimum of the same tittle, will produce no effective result. The minima at 135° of curve A (FIGURE 2) and 135° and 225° of curve C (FIGURE 4), are examples of such ineffective minima.

By virtue of the operation of the slope sensor of FIGURE 6, a firing pulse arrives at the data compiler in circuit 77 between the next-to-the-last and the last in pulses of a series that ends in zero slope, regardless of whether the pulse succeeding zero slope is an in pulse or an out pulse. The in pulse immediately preceding the firing pulse will have actuated a particular cross chain from R to A, leaving the next cross chain at R. This next cross chain will be the one that receives the firing pulse and directs it to the output printer through its line corresponding to lines 116, 126. The last in pulse of the series in question will then move the just-fired cross chain to A.

If a firing pulse should appear in circuit 77 when all of the relays are in their active positions, such an event would indicate either an excessive upswing as above described or a malfunctioning of the apparatus. Accordingly, such an inappropriate firing pulse is diverted by the last relay of in volley chain 101 to cause the letter E to be printed by the ouput printer, thereby indicating an error.

A firing pulse arrives in circuit 87 between the next-to-the-last and the last out pulses of a series that ends in zero slope and is succeeded by at least one out pulse. The out pulse immediately preceding the firing pulse will have actuated a particular cross chain from A to R, leaving the next cross chain at A. This next cross chain will be the one that receives the firing pulse and directs it to the output printer through its line corresponding to lines 118, 128. The last out pulse of the series in question will then move the just-fired cross chain to R, and the succeeding out pulse will move the chain above the just-fired chain from A to R. Accordingly, when a $(-)0(-)$ firing pulse is received, there will be at least two cross chains that are still at A and are located above said particular cross chain. This is the reason why no relay corresponding to relays 115, 125 is necessary in cross chain V50.

The slope sensor of FIGURE 6 will generate a firing pulse in circuit 87 when a $(-)0(-)$ slope change occurs after zero inventory has been reached. Because of the zero inventory condition, such a slope change is to be disregarded. When such a firing pulse is received, all of the relays of out volley chain 105 will be in their rest positions. Accordingly, such a firing pulse is conducted to ground at the last relay of chain 105, and performs no function.

It is believed that the way in which the above-discussed zero inventory and volley reports are derived from curves A, B and C of FIGURES 2, 3 and 4 by slope sensor 21 and data compiler 23 of FIGURES 6 and 7, will be clear from the foregoing description. However, there are a few significant conditions that do not appear in connection with these curves, and which will now be discussed. This may conveniently be done by considering these conditions as variations of curve C of FIGURE 4.

In curve C, upswing 48 generates a series of 37 in pulses. This series is succeeded by a series of 23 out pulses generated by downswing 49. This leaves what we have called a "remainder" of 14 units, which is deflected in the apparatus of FIGURE 7 by cross chains V24 through V37 being in their A positions at time 135°. The next upswing 50 has an ordinate length shorter than downswing 49 and, therefore, leaves this remainder untouched. However, should upswing 50 be longer, say 25 units, it would actuate chains V1 through V23 to A and then, skipping over or bypassing the remainder chains already at A, would actuate chain V38 to A, leaving chain V39 as the lowest numbered cross chain with its relays at R. Accordingly, a firing pulse then arriving in circuit 77 would cause a volley of V39 to be printed, after which chain V39 would be moved to A. It will be observed that the remainder left after downswing 49 would thus be absorbed and added to the volley produced by the 25 in pulses of revised upswing 50. Such remainder absorption may take place any number of times during a tittle depending, of course, upon the shape of the curve being analyzed, and may involve more than one such remainder.

Returning now to curve C as shown in FIGURE 4, we note that downswing 51 has the same number of units as upswing 50 and, therefore, merely restores chains V1 and V2 to R. If downswing 51 should be somewhat longer without being long enough to produce zero inventory, it would serve to reduce the size of the remainder left by swings 48 and 49. For example, if the revised downswing were 5 units, it would, after actuating chains V1 and V2 to R, skip over or bypass chains V3 through V23, which it would find at R, and actuate chains V24, V25 and V26 from A to R. This would reduce the remainder to 11 units, represented by chains V27 through V37, inclusive. Such remainder reduction may also occur repeatedly during a tittle, the limit being reached when all remainders are canceled, producing zero inventory.

It will be observed that these skipping or "leap-frogging" operations constitute mathematical discontinuities when they are considered from the standpoint of the sequence of operations of loading chain 102 and clearing chain 103. Such discontinuities are exceedingly difficult to handle mathematically, but chains 102 and 103 handle them electrically without difficulty. It is believed that the distortions of the scala media of the human cochlea that are produced by the entry into and withdrawal from the cochlea of successive unit volumes of perilymph, present similar discontinuities which the cochlea is able to handle hydraulically, in a manner not too remote from the electrical handling of the present invention. In other words, chains 102 and 103 are believed to perform functions roughly similar to those performed by the scala media. But once again, whether this is true or not is presently immaterial, the essential point being that this invention produces volleys that furnish an effective analysis of the complex wave under consideration.

Loading chain 102 and clearing chain 103 serve as interconnected counting chains for the in pulses and out pulses, respectively. In counting the in pulses, chain 102, in effect, numbers them serially in accordance with the volley number of the particular cross chain that each in pulse energizes. These cross chains have successively higher scalar positions along the loading chain corresponding to their serial numbers. Once an in pulse has energized the cross chain to which it is assigned, it retains that scalzar position until canceled by an out pulse. The out pulses entering clearing chain 103 are similarly counted, serially numbered and assigned to the particular cross chains that they energize. In effect, each clearing pulse cancels the particular in pulse having the same serial number, and restores that cross chain to its rest position, whereby the corresponding scalar position of the loading chain is put in condition to receive another in pulse to replace the one previously canceled.

From the foregoing, it will be observed that the method of this invention, as thus far described, comprises converting each upswing of the complex wave being analyzed into a series of in pulses, converting each downswing of the wave into a series of out pulses, determining from said series of pulses the points at which the slope of the wave curve passes through zero, discarding any initial series of out pulses, recording the instant of commencement of the first in pulse as a zero inventory time, tabulating the values of volleys of pulses at slope change points of $(+)0(-)$, $(+)0(+)$ and $(-)0(-)$, recording said volley values and times, tabulating when zero inventory is next reached, discarding any portion of an out pulse series beyond that sufficient to reduce the inventory to zero, and recording the time of departure from the last-mentioned zero inventory.

Not all of these steps are essential to the method of this invention, nor do the essential steps need to be performed in the sequence just described. For example, where the successive tittles contain relatively large numbers of rapidly successive volleys, it may be unnecessary to record the volley times. Conversely, there may well be problems where the determination of effective pitch, which is dependent on the zero inventory times, is irrelevant. In such case, it would be sufficient to record the volley times and values, omitting the zero inventory times. It is difficult to imagine a situation in which one would not need either the zero inventory times or the volley times, but the possibility cannot be excluded. On the other hand, in any analysis according to this invention, determination of the volley values is essential.

In the operation of the apparatus illustrated in the drawings, the in pulses and out pulses are first generated, the $(-)0(+)$ slope changes are ascertained, and zeroing pulses generated by these slope chages are used to test whether zero inventory exists. These operations are susceptible to considerable modification. For example, in the apparatus of FIGURE 1, we may insert a one-way drive mechanism between stylus 11 and reciprocating strip 12. This one-way drive mechanism should provide a lost motion connection from stylus 11 to strip 12 such that in movements of the stylus are transmitted undiminished to strip 12, but out movements of the stylus have no direct effect on the strip except to limit the out movements of he strip. Strip 12 could be moved outward by a compression spring so arranged that it is compressed by in movements of the strip and thereby tends to restore it to its rest position, but exerts no force on the strip when it is in its out movements, strip 12 would then follow tracing stylus 11 up to, but not beyond, the rest position of the strip. The condition of zero inventory would exist whenever strip 12 was in its rest position and this could be measured, for example, by a strain gauge reporting when the restoring spring was not under compression. Accordingly, it would be unnecessary to have slope sensor 21 determine the $(-)0(+)$ slope changes, nor would zeroing chain 104 be required. Instead, the signal produced by the strain gauge could be used to instruct output printer 24 and timer 25.

In brief, the foregoing one-way drive mechanism is a push-no-pull connection. It is believed that such a connection is provided by the ossicles of the human middle ear, but once again, whether this is true is presently immaterial.

It will be evident to those skilled in the art that such a mechanical arrangement could be duplicated electrically. In either case, any initial downswing is eliminated, and any portion of a subsequent downswing beyond that necessary to reduce the inventory to zero is also eliminated. In these modifications, therefore, the pulse generators 15 or 15' and 16 or 16' perform no work during the eliminated downswing portions.

As thus far described, the partials and their relative magnitudes are determined by inspection of the record produced by output printer 24 or 24'. If desired, this information could also be gathered and reported by machine operations, although the necessity of so doing appears questionable. For instance, at the cost of considerable complication of the circuitry, the cross chains of FIGURE 7 could be so construed that, when fired, the cross chain that is presently the one conditioned to print a volley, and all the cross chains below that one, each would deliver a counting pulse to the equivalents of lines 116, 126, etc., or lines 118, 128, etc., depending upon the particular firing pulse in question. Each of the counting pulse lines would then be provided with a separate pulse counter. By recording the outputs of these pulse counters, one could obtain directly reports such as the 1P16, 3P3, M19 described in connection with FIGURE 2, in addition to the zero inventory and volley reports. Alternatively, the record produced by output printer 24 or 24' could be supplied to a computer programmed to carry out the computations involved in determining the partials from the volleys.

In the machine recognition of sounds, it is sometimes desirable to reduce the unknown and known sounds to a common loudness base. This may be done by expressing the volley values as percentages of the value of the longest volley of the sample of the sound under consideration. For example, in the case of curve B of FIGURE 3, the complete report would then become: T0, Z; T90, 50; T180, 100; T270, 50; T360, Z; 1P50; 3P50. Similarly, when it is desired to eliminate the effect of overall pitch level (pitch register), without losing pitch variations from instant to instant, this can be accomplished by expressing the tittle durations as percentages of the duration of an arbitrarily selected tittle, for example, the longest tittle of the sample.

In the foregoing, the zero inventory and volley reports have been described as being actually typed in alphanumeric form by output printer 24 or 24'. It will be evident, however, that the necessary recording could be accomplished by any other desired form of information display.

Many other modifications will suggest themselves to those skilled in the art, especially as regards the circuitry shown in FIGURES 6 and 7 and the details of its functioning. Accordingly, I desire to be limited only by the scope of the appended claims.

I claim:

1. The method of analysis of a complex wave capable of being represented by a continuous plane curve, the abscissas of which correspond to values of an independent variable and the ordinates to values of a dependent variable, which includes the steps of continuously determining an inventory of the upswings and downswings of the wave curve, the increase in ordinate values of the dependent variable during an upswing being considered as an addition to inventory, and the decrease therein during a downswing being considered as a withdrawal from inventory, while discarding any initial downswing and discarding any portion of a subsequent downswing beyond that sufficient to reduce said inventory to zero, converting upswings of the wave into separate series of in pulses, the number of in pulses in each series being directly proportional to the increase in ordinate values of the dependent variable during the corresponding upswing, converting downswings of the wave into separate series of out pulses, the number of out pulses in each series being directly proportional to the decrease in the ordinate values of the dependent variable during any portion of the corresponding downswing that is effective in reducing inventory, determining critical points that are substantially the points at which the slope of the wave curve passes through zero in the course of slope changes, and recording the values of volleys of pulses at selected critical points, the value of each volley being determined by a tabulation of said series of in pulses and out pulses since the immediately preceding zero inventory.

2. The method as claimed in claim 1 in which the values of the independent variable are recorded at substantially the points at which said inventory rises above zero.

3. The method as claimed in claim 1 in which the values of the independent variable are recorded at said critical points.

4. The method as claimed in claim 1 in which said critical points are derived solely from said series of in pulses and out pulses.

5. The method as claimed in claim 1 in which said volley tabulation includes the steps, following each condition of zero inventory, of counting and serially numbering the in pulses in the first series of in pulses, said serial numbers corresponding to successively higher scalar positions of the in pulses, similarly counting and assigning higher serial numbers to any immediately succeeding series of in pulses, counting and serially numbering the out pulses of the first series of out pulses, similarly counting and assigning higher serial numbers to any immediately succeeding series of out pulses, treating said out pulses as cancelling a like number of in pulses commencing with the lowest numbered scalar position then occupied by an in pulse, holding any uncanceled in pulses as a remainder in their respective scalar positions, counting and serially numbering the next series of in pulses until the previously canceled scalar positions are re-filled and then assigning to any further in pulses serial numbers immediately above the serial numbers of said remainder, and repeating the foregoing steps until zero inventory is again reached.

6. The method of analysis of a complex wave capable of being represented by a continuous plane curve, the abscissas of which correspond to values of an independent variable and the ordinates to values of a dependent variable, which includes the steps of converting each upswing of the wave into a series of in pulses the number of which is directly proportional to the increase in the ordinate values of the dependent variable during the upswing, converting each downswing of the wave into a series of out pulses the number of which is directly proportional to the decrease in the ordinate values of the dependent variable during the downswing, discarding any initial out pulse series, continuously determining an inventory of said in and out pulses, said in pulses being considered as additions to inventory and said out pulses being considered as withdrawals from inventory, discarding any portion of an out pulse series beyond that sufficient to reduce said inventory to zero, determining critical points that are substantially the points at which the slope of the wave curve passes through zero in the course of slope changes, and recording the values of volleys of pulses at selected critical points, the value of each volley being determined by a tabulation of said series of in pulses and retained out pulses since the immediately preceding zero inventory.

7. The method as claimed in claim 6 in which the values of the independent variable are recorded at substantially the points at which said inventory rises above zero.

8. The method as claimed in claim 6 in which the values of the independent variable are recorded at said critical points.

9. The method as claimed in claim 6 in which said critical points are derived solely from said series of in pulses and out pulses.

10. The method as claimed in claim 6 in which said volley tabulation includes the steps, following each condition of zero inventory, of counting and serially numbering the in pulses in the first series of in pulses, said serial numbers corresponding to successively higher scalar positions of the in pulses, similarly counting and assigning higher serial numbers to any immediately succeeding series of in pulses, counting and serially numbering the out pulses of the first series of out pulses, similarly counting and assigning higher serial numbers to any immediately succeeding series of out pulses, treating said out pulses as canceling a like number of in pulses commencing with the lowest numbered scalar position then occupied by an in pulse, holding any uncanceled in pulses as a remainder in their respective scalar positions, counting and serially numbering the next series of in pulses until the previously canceled scalar positions are re-filled and then assigning to any further in pulses serial numbers immediately above the serial numbers of said remainder, and repeating the foregoing steps until zero inventory is again reached.

References Cited

UNITED STATES PATENTS

| | | |
|---|---|---|
| 3,293,609 | 12/1966 | Martin. |
| 3,308,441 | 3/1967 | Dusheck. |
| 3,310,784 | 3/1967 | Hilinski. |
| 3,334,298 | 8/1967 | Monrad-Krohn. |

RUDOLPH V. ROLINEC, *Primary Examiner.*

P. F. WILLE, *Assistant Examiner.*